United States Patent
Lee et al.

(10) Patent No.: US 12,438,245 B2
(45) Date of Patent: Oct. 7, 2025

(54) BATTERY CONNECTION APPARATUS FOR VEHICLE

(71) Applicants: HYUNDAI MOTOR COMPANY, Seoul (KR); KIA CORPORATION, Seoul (KR); YURA CORPORATION CO., LTD.

(72) Inventors: Sam Gyun Lee, Seoul (KR); Se Kwun Kim, Seoul (KR); Ho Ryeon Yoon, Bucheon-si (KR)

(73) Assignees: HYUNDAI MOTOR COMPANY, Seoul (KR); KIA CORPORATION, Seoul (KR); YURA CORPORATION CO., LTD., Seongnam-si (KR)

(*) Notice: Subject to any disclaimer, the term of this patent is extended or adjusted under 35 U.S.C. 154(b) by 507 days.

(21) Appl. No.: 17/939,248

(22) Filed: Sep. 7, 2022

(65) Prior Publication Data
US 2023/0111837 A1    Apr. 13, 2023

(30) Foreign Application Priority Data
Oct. 7, 2021 (KR) .................. 10-2021-0133257

(51) Int. Cl.
*H01M 50/543* (2021.01)
*H01M 50/502* (2021.01)
*H01R 11/28* (2006.01)

(52) U.S. Cl.
CPC ....... *H01M 50/543* (2021.01); *H01M 50/502* (2021.01); *H01R 11/281* (2013.01); *H01M 2220/20* (2013.01)

(58) Field of Classification Search
CPC ............. H01M 50/543; H01M 50/502; H01M 2220/20; H01R 11/282; H01R 11/283; H01R 11/281

USPC ......................................... 429/179
See application file for complete search history.

(56) References Cited

U.S. PATENT DOCUMENTS
2020/0185692 A1* 6/2020 Julson ................ H01M 50/553

FOREIGN PATENT DOCUMENTS
DE       10221057 A1 * 11/2003 ............. H01R 4/489
DE  102007008041 A1 *  1/2008 ........... H01R 11/282

OTHER PUBLICATIONS
English Translation of DE 10221057 A1 (Year: 2025).*

* cited by examiner

Primary Examiner — Nicholas A Smith
Assistant Examiner — Kevin Nguyen
(74) Attorney, Agent, or Firm — MCDONNELL BOEHNEN HULBERT & BERGHOFF LLP

(57) ABSTRACT

A battery connection apparatus for a vehicle including a cable terminal includes a terminal connection part provided in a tubular shape to be fitted to a circumference of a battery terminal protruding from a battery of the vehicle, the terminal connection part having an opening formed in a shape of being gradually widened between opposite ends thereof in a circumferential direction and male threads formed on an outer circumference thereof, and a fixing member provided to fix the battery terminal connection part in a state in which the battery terminal connection part is connected to the battery terminal, the fixing member having female threads, that correspond to the male threads, formed on an inner circumference thereof to be screwed to the outer circumference of the battery terminal connection part.

16 Claims, 11 Drawing Sheets

BATTERY CONNECTION APPARATUS FOR VEHICLE

CROSS REFERENCE TO RELATED APPLICATIONS

This application is based on and claims priority under 35 U.S.C. § 119 to Korean Patent Application No. 10-2021-0133257, filed on Oct. 7, 2021, in the Korean Intellectual Property Office, the disclosure of which is incorporated by reference herein in its entirety.

BACKGROUND

1. Field

The disclosure relates to a battery connection apparatus for a vehicle to connect between a terminal of a battery of the vehicle and a battery cable.

2. Description of the Related Art

In general, a battery is installed in an engine room of a vehicle. The battery is fixed to the engine room, and a battery cable for applying power to electrical components of the vehicle is connected to the fixed battery.

The battery and the battery cable are connected through a battery terminal and a cable terminal. The battery terminal is provided to protrude from the battery, and the cable terminal includes a battery terminal connection part connected to the battery terminal and a cable connection part connected to the battery cable, thereby connecting the battery terminal and the battery cable.

The battery terminal is generally provided to protrude upward from an upper surface of the battery, and the battery terminal connection part is provided in the form of a ring cut out on one side of a circumference thereof and may be fitted around the battery terminal. The battery terminal connection part in this state may be fixed in a state of being connected to the battery terminal through a tightening bolt fastened such that the cut-out portion is tightened and a nut to which the tightening bolt is coupled. In this case, in general, the tightening bolt and nut are fastened to the battery terminal connection part in a direction perpendicular to a protruding direction of the battery terminal.

However, in the fixed structure of the battery terminal connection part as described above, because interference occurs between a tool used for fastening the tightening bolt and other components in the engine room disposed around the battery, the workability of connecting the battery and the battery cable may be deteriorated.

SUMMARY

It is an aspect of the disclosure to provide a battery connection apparatus for a vehicle capable of improving work efficiency of connecting a terminal of a battery of the vehicle and a battery cable.

It is another aspect of the disclosure to provide a battery connection apparatus for a vehicle capable of simplifying a connection structure between a terminal of a battery of the vehicle and a battery cable.

Additional aspects of the disclosure will be set forth in part in the description which follows and, in part, will be obvious from the description, or may be learned by practice of the disclosure.

In accordance with an aspect of the disclosure, a battery connection apparatus for a vehicle includes a cable terminal including a terminal connection part provided in a tubular shape to be fitted to a circumference of a battery terminal protruding from a battery of the vehicle, the terminal connection part having an opening formed in a shape of being gradually widened between opposite ends thereof in a circumferential direction and male threads formed on an outer circumference thereof, and a fixing member provided to fix the battery terminal connection part in a state in which the battery terminal connection part is connected to the battery terminal, the fixing member having female threads, that correspond to the male threads, formed on an inner circumference thereof to be screwed to the outer circumference of the battery terminal connection part.

The battery terminal connection part may be provided such that inner and outer diameters thereof are expanded from one end toward the other end along a screwing direction of the fixing member in a state in which an external force is removed.

The fixing member may have an inner diameter of a constant size in the screwing direction.

The battery terminal connection part may be provided such that the outer diameter of an end in a direction opposite to the screwing direction corresponds to the inner diameter of the fixing member.

The battery terminal may have a diameter of a constant size in a protruding direction, and the battery terminal connection part may be provided such that the inner diameter of an end in the screwing direction is larger than the diameter of the battery terminal.

The battery terminal connection part may be provided such that the inner diameter of an end in a direction opposite to the screwing direction corresponds to the diameter of the battery terminal.

In a state in which the screwing of the fixing member to the battery terminal connection part is completed, the outer circumference of the battery terminal connection part may be in close contact with the inner circumference of the fixing member, and an inner circumference of the battery terminal connection part may be in close contact with an outer circumference of the battery terminal.

The cable terminal may further include a cable connection part provided to be connected to a battery cable for applying power of the battery to electric components of the vehicle, and a connector provided to connect the cable connection part and the battery terminal connection part, the connector may include a body portion, and an extension portion extending from the body portion to be connected to a circumference of the battery terminal connection part, and a width of the extension portion may be formed to be smaller than a width of the body portion.

The cable terminal may further include a cable connection part provided to be connected to a battery cable for applying power of the battery to electric components of the vehicle, and the cable connection part may include a first pressing portion of a ring shape provided to press and fix a circumference of a core wire at an end of the battery cable from which a sheath is stripped, a second pressing portion of a ring shape provided to press and fix a circumference of a portion covered by the sheath in the inside of the end of the battery cable, and a connection rib provided to connect one sides of circumferences of the first pressing portion and the second pressing portion.

The battery connection apparatus may further include a rotation limiting part provided to limit the rotation of the fixing member at a time point when the screwing of the fixing member to the battery terminal connection part is completed.

The rotation limiting part may include a support protrusion protruding to be supported on an outer surface of the battery around the battery terminal at an end of the fixing member in a screwing direction.

An end of the support protrusion in a protruding direction may be formed in a convex curved surface in the protruding direction.

The rotation limiting part may include a locking protrusion provided on the inner circumference of the fixing member, and a locking groove provided on the outer circumference of the battery terminal connection part so that the locking protrusion is inserted therein.

The locking protrusion may be provided on an end of the female thread in the screwing direction, and the locking groove may be provided on a screw groove at a position corresponding to an end of the male thread in the screwing direction.

An inclined surface for guiding the locking protrusion to the locking groove may be provided at one end of the locking protrusion in a tightening direction of the fixing member, and the other end of the locking protrusion in a loosening direction of the fixing member may be angularly provided to suppress the locking protrusion from being separated from the locking groove.

The fixing member may include a body portion of a tubular shape screwed to the battery terminal connection part, and a cover portion provided to cover an end of the body portion corresponding to a direction opposite to a screwing direction of the fixing member, and a polarity indicator indicating a polarity of the battery terminal may be provided in a groove shape in a central portion of an outer surface of the cover portion.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Hereinafter an embodiment of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
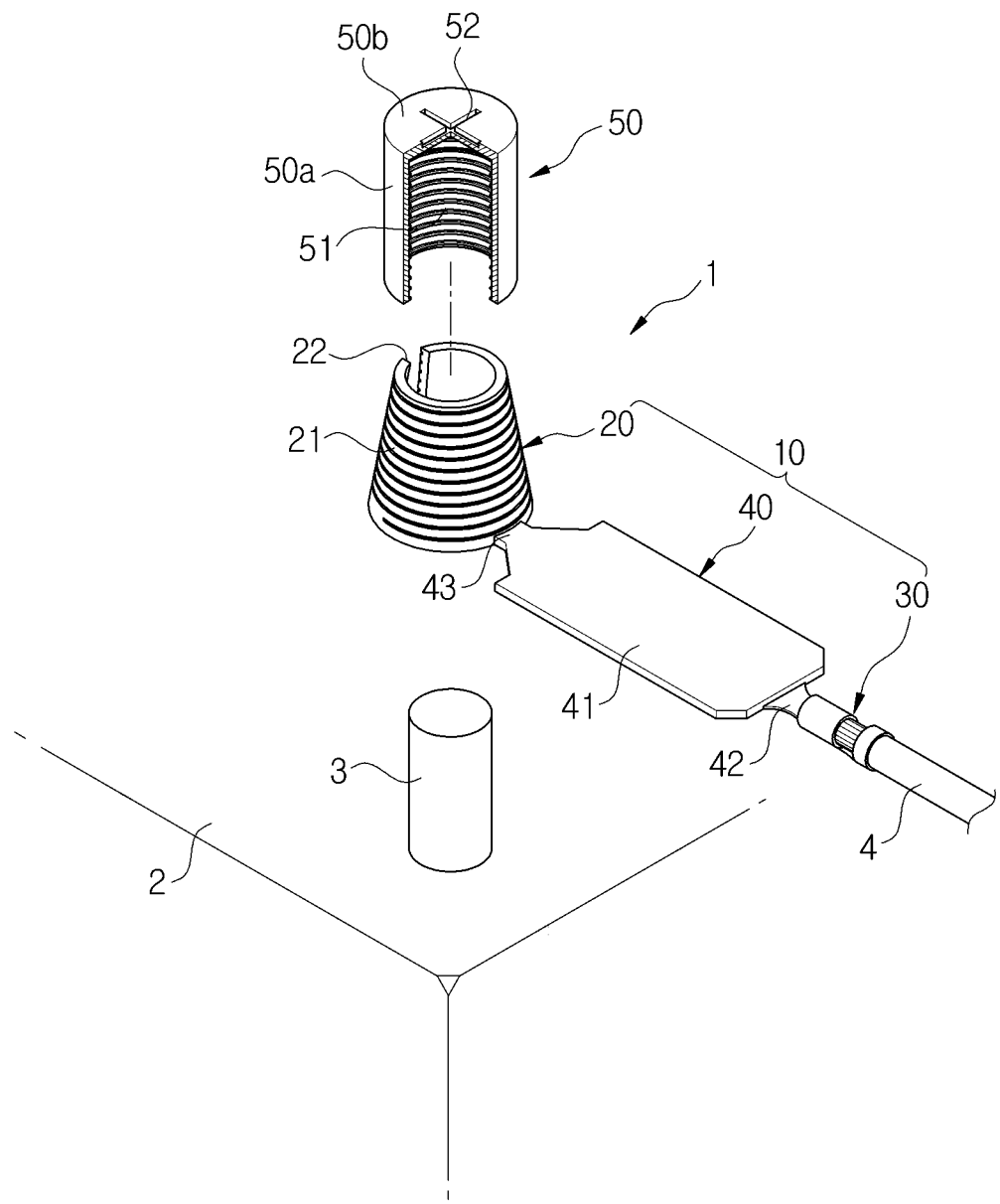
FIG. 1 is an exploded perspective view of a battery connection apparatus for a vehicle according to an embodiment of the disclosure.

As illustrated in FIG. 1, a battery connection apparatus 1 for a vehicle according to an embodiment (hereinafter, abbreviated as 'connection apparatus') is provided to connect a battery terminal 3 of a battery 2 of the vehicle and a battery cable 4.

The battery 2 includes the battery terminal 3 provided to protrude and may be installed to be fixed to an engine room of the vehicle. The battery terminal 3 is configured as a pair of positive and negative battery terminals and may protrude from an upper surface of the battery 2 to protrude to an upper portion of the engine room. The battery terminal 3 may be provided to have a constant diameter in a protruding direction.

The battery 2 is configured in the form of a secondary battery in which charging and discharging are performed and may be charged by receiving power generated from a generator of the vehicle.

Figure 2:
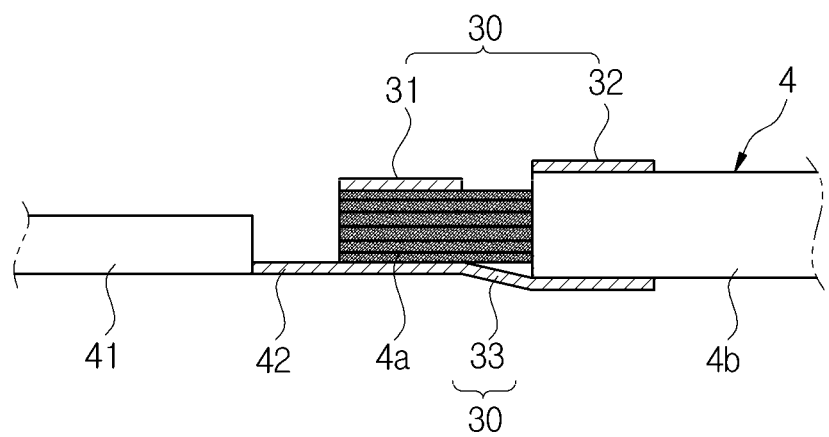
FIG. 2 is an enlarged cross-sectional view illustrating a structure of a cable connection part in the battery connection apparatus in FIG. 1.

The battery cable 4 may allow the power of the battery 2 to be applied to electric components of the vehicle. As illustrated in FIG. 2, the battery cable 4 includes a core wire 4a and a sheath 4b covering a circumference of the core wire 4a, and may conduct electricity with the connection apparatus 1 through the core wire 4a at an end of the battery cable 4 from which the sheath 4b is stripped.

The connection apparatus 1 includes a cable terminal 10 to connect the battery terminal 3 and the battery cable 4 so that the power of the battery 2 may be applied to the electric components through the battery cable 4.

The cable terminal 10 may include a battery terminal connection part 20 provided to connect to the battery terminal 3, a cable connection part 30 provided to connect to the battery cable 4, and a connector 40 provided to connect the battery terminal connection part 20 and the cable connection part 30.

The cable terminal 10 may be provided as a metal material with excellent electrical conductivity, and the connector 40 may be provided in the form of a plate connecting the battery terminal connection part 20 and the cable connection part 30. As a material of the cable terminal 10, copper, aluminum, or an alloy containing these materials may be used.

As illustrated in FIGS. 1 and 2, the cable connection part 30 may include a first pressing portion 31 provided to press and fix the circumference of the core wire 4a at the end of the battery cable 4 from which the sheath 4b is stripped, a second pressing portion 32 provided to press and fix a circumference of a portion covered by the sheath 4b in the inside of the end of the battery cable 4, and a connection rib 33 provided to connect one sides of circumferences of the first pressing portion 31 and the second pressing portion 32.

The first pressing portion 31 and the second pressing portion 32 may be provided in the form of a ring in which a thickness between an inner circumference and an outer circumference is thin to facilitate pressing deformation.

The first pressing portion 31 may be provided to have an inner diameter corresponding to a diameter of the core wire 4a, and the second pressing portion 32 may be provided to have a relatively larger inner diameter than the first pressing portion 31 in consideration of a thickness of the sheath 4b added to the core wire 4a.

The connection rib 33 connecting the one sides of the circumferences of the first pressing portion 31 and the second pressing portion 32 may connect the first and second pressing portions 31 and 32 to form one body while allowing the pressing deformation of the respective pressing portions 31 and 32 to be smoothly generated.

Because the cable connection part 30 as described above is fixed to the battery cable 4 in a method of being pressed on a circumference of the battery cable 4 without using a separate fastening means, the cable connection part 30 may contribute to improving work efficiency of connecting the battery terminal 3 and the battery cable 4.

The connector 40 includes a body portion 41 in the middle and a pair of extension portions 42 and 43 extending from opposite ends of the body portion 41, and the cable connection part 30 may form one body with the connector 40 through the extension portion 42 connecting the body portion 41 and one side of the circumference of the first pressing portion 31.

Although not shown separately through a drawing, the cable connection part 30 may be installed on the body portion 41 side through a fastening member such as a bolt.

The battery terminal connection part 20 may form one body with the connector 40 in a form of being connected to the extension portion 43, and the cable terminal 10 may be connected to the battery terminal 3 through the battery terminal connection part 20 in a state in which the cable connection part 30 is coupled to the battery cable 4.

The extension portion 43 may have a width smaller than a width of the body portion 41 so that the battery terminal connection part 20 may be elastically connected to the connector 40. Therefore, the battery terminal connection part 20 may be suppressed from being easily separated from the connector 40 by an external force generated in a process of being connected to the battery terminal 3.

Figure 3:
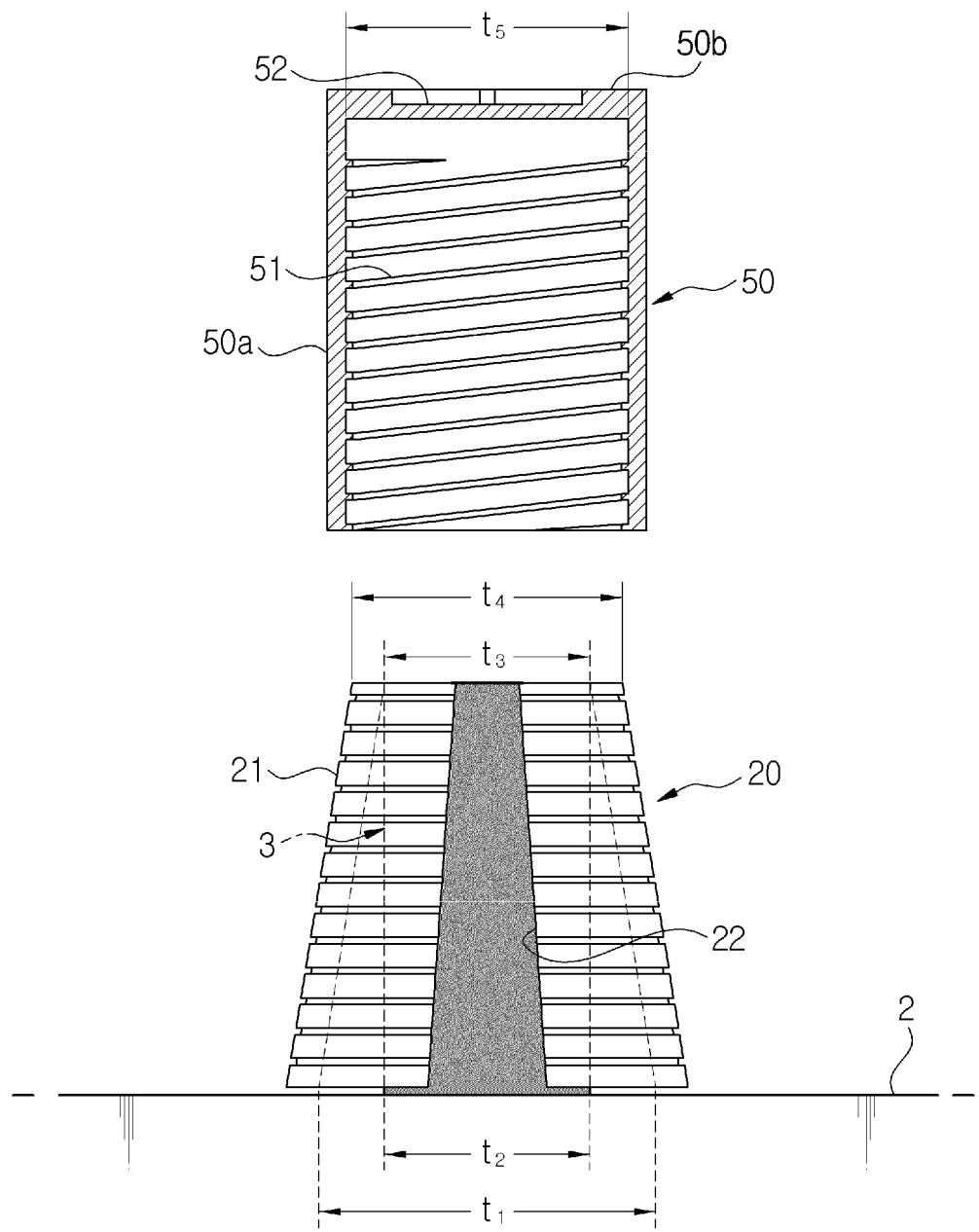
FIG. 3 is a cross-sectional view illustrating a state in which a battery terminal connection part of the battery connection apparatus according to an embodiment of the disclosure is inserted into a battery terminal.
Figure 4:
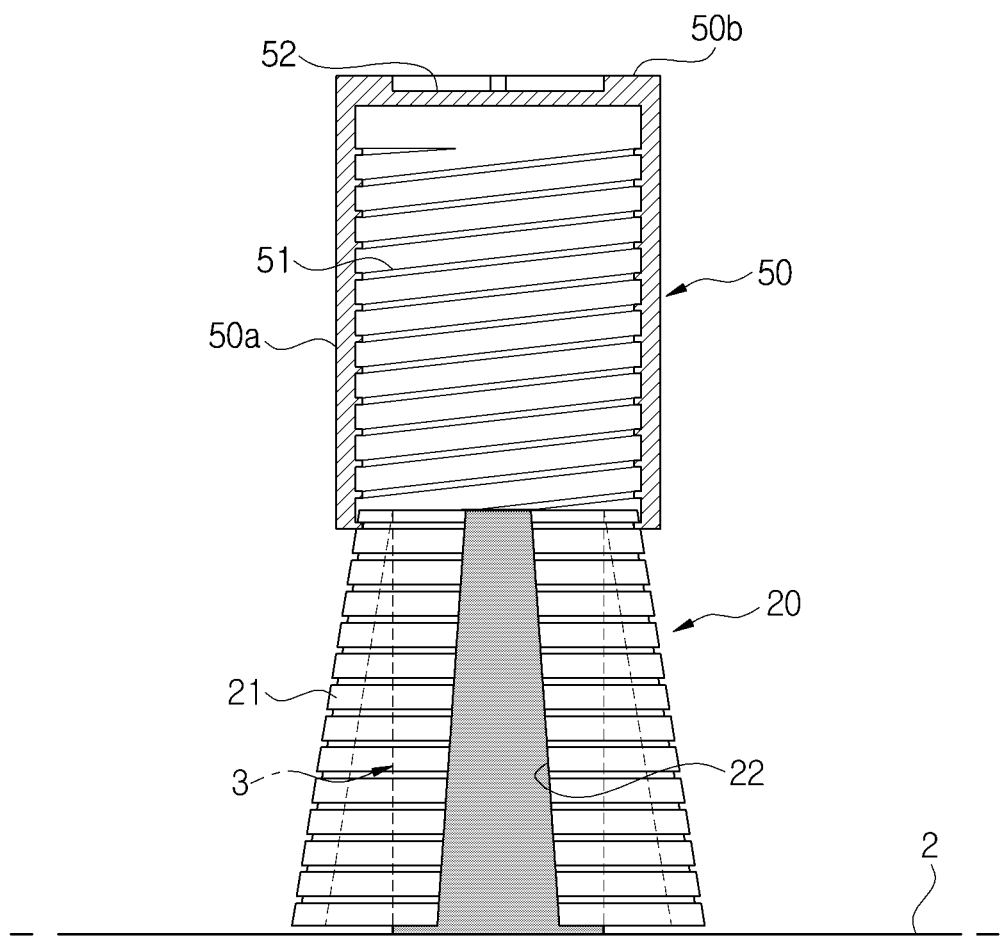
FIG. 4 is a view illustrating a process in which a fixing member is coupled to the battery terminal connection part in the state of FIG. 3.
Figure 5:
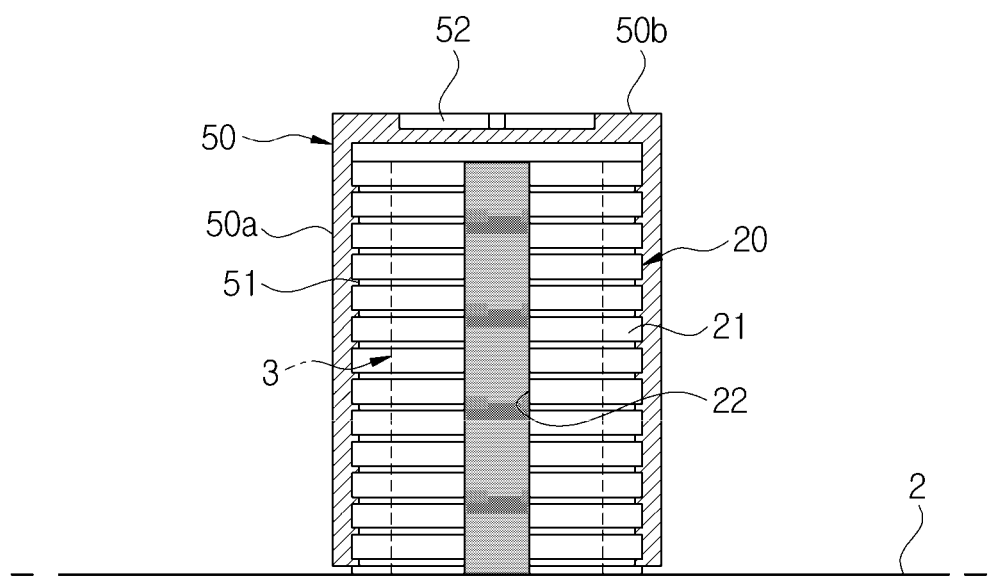
FIG. 5 is a view illustrating a state in which the coupling of the fixing member to the battery terminal connection part is completed in the state of FIG. 4.

As illustrated in FIGS. 3 to 5, the battery terminal connection part 20 is provided in a tubular shape having an opening 22 formed in a shape of being gradually widened between opposite ends thereof in a circumferential direction to be inserted into the circumference of the battery terminal 3 and may be provided such that male threads 21 are formed on an outer circumference thereof.

The connection apparatus 1 for fixing the battery terminal connection part 20 in a state of being connected to the battery terminal 3 may include a fixing member 50 having female threads 51 corresponding to the male threads 21 of the battery terminal connection part 20 on an inner circumference thereof to be screwed to the outer circumference of the battery terminal connection part 20.

Therefore, as in a state in which the battery terminal connection part 20 having the outer circumference provided in the form of a male screw is fitted to the circumference of the battery terminal 3, the fixing member 50 having an inner circumference provided in the form of a female screw is screwed to the outer circumference of the battery terminal connection part 20, the battery terminal connection part 20 may be fixed to be maintained in close contact with the circumference of the battery terminal 3.

According to the fixing structure of the battery terminal connection part 20 as described above, the fixing member 50 may be coupled to the battery terminal connection part 20 in a vertical direction corresponding to the protruding direction of the battery terminal 3. Therefore, interference between the tool and the other components located around the battery 2 in the engine room in a process of rotating the fixing member 50 with a tool in order to couple the fixing member 50 to the battery terminal connection part 20 may be suppressed or prevented.

In addition, in the fixing structure of the battery terminal connection part 20 as described above, the battery terminal connection part 20 may be fixed to the battery terminal 3 by using only one part, that is, the fixing member 50 performing the function of a female screw, by the battery terminal connection part 20 whose outer circumference performs the function of a male screw. Therefore, the connection apparatus 1 may contribute to simplifying the connection structure between the battery terminal 3 and the battery cable 4.

The fixing member 50 may include a body portion 50a of a tubular shape having the female threads 51 on the inner circumference thereof to be screwed to the outer circumference of the battery terminal connection part 20, and a cover portion 50b covering an end of the body portion 50a corresponding to a direction opposite to a screwing direction of the fixing member 50.

The fixing member 50 including the body portion 50a and the cover portion 50b may also function as a cover for completely covering and hiding the battery terminal connection part 20.

The body portion 50a may be provided to have an inner diameter of a constant size along the screwing direction of the fixing member 50 so that the battery terminal connection part 20 may be in even close contact with an outer surface of the battery terminal 3. The fixing member 50 may be screwed to the battery terminal connection part 20 from an upper side to a lower side. Accordingly, the screwing direction may be a downward direction, and the opposite direction of the screwing direction may be an upward direction.

The cover portion 50b may be provided with a polarity indicator 52 indicating a polarity of the battery terminal 3 in order to identify the polarity of the battery terminal 3. The polarity indicator 52 may be provided to display a plus or minus sign on an outer surface of the cover portion 50b. The polarity indicator 52 may be provided in the form of a groove, into and on which a blade of the tool aforementioned may be inserted and caught, in the center of the cover portion 50b to be used as a tool insertion groove for rotation of the fixing member 50.

The battery terminal connection part 20 may be provided such that an inner diameter and an outer diameter thereof are expanded from one end toward the other end along the screwing direction of the fixing member 50 in a state in which the external force is removed before the fixing member 50 is coupled. As illustrated in the drawings, the one end and the other end of the battery terminal connection part 20 may be an upper end and a lower end of the battery terminal connection part 20, respectively, and the battery terminal connection part 20 may have a substantially truncated cone or cone-shaped appearance.

The battery terminal connection part 20, whose inner diameter is expanded downward, may easily guide the insertion of the battery terminal 3 to be inserted therein, and the battery terminal connection part 20 whose outer diameter is reduced upward may be advantageously applied to the coupling of the fixing member 50 to be coupled to the outer circumference thereof.

As illustrated in FIG. 3, the battery terminal connection part 20 may be provided such that an inner diameter t1 of the lower end thereof is larger than a diameter t2 of the battery terminal 3 so that the battery terminal connection part 20 may be easily fitted to the circumference of the battery terminal 3 before the fixing member 50 is coupled to the battery terminal connection part 20.

An inner diameter t3 of the upper end of the battery terminal connection part 20 may be formed to correspond to the diameter t2 of the battery terminal 3 so that the inner circumference of the upper end of the battery terminal connection part 20 may be supported in a state of being seated on an outer circumference of an upper end of the battery terminal 3. Therefore, the battery terminal connection part 20 fitted to the circumference of the battery terminal 3 may be stably supported on the battery terminal 3 in a state in which movement thereof is suppressed.

In addition, the battery terminal connection part 20 may be provided such that an outer diameter t4 of the upper end thereof corresponds to an inner diameter t5 of the fixing member 50, so that at an initial stage of coupling with the fixing member 50, the upper end of the outer circumference of the battery terminal connection part 20 may be aligned with a lower end of the inner circumference of the fixing member 50.

FIG. 4 illustrates a state in which the upper end of the outer circumference of the battery terminal connection part 20 is fitted to the lower end of the inner circumference of the fixing member 50. In this state, the fixing member 50 may be rotated by the tool to be screwed to the connection battery terminal part 20. At this time, the tool may rotate the fixing member 50 in a tightening direction in a state in which the blade of the tool is inserted to be caught on the polarity indicator 52.

When the fixing member 50 rotates in the tightening direction, as the female threads 51 of the fixing member 50 and the male threads 21 of the battery terminal connection part 20 are gradually engaged, the inner circumference of the fixing member 50 presses the outer circumference of the battery terminal connection part 20, and the inner circumference of the battery terminal connection part 20 may be in close contact with the outer circumference of the battery terminal 3.

In a process of engaging the female threads 51 and the male threads 21, the female threads 51 are coupled to screw grooves formed between the male threads 21, and the male threads 21 are coupled to screw grooves formed between the female threads 51.

Figure 6:
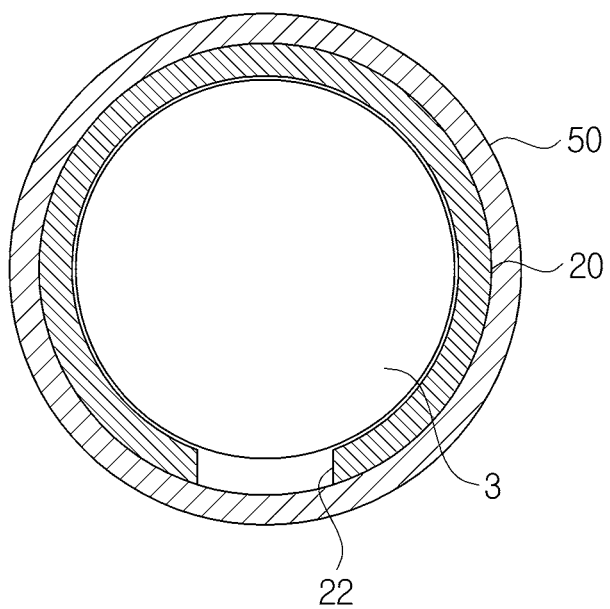
FIG. 6 is a plan cross-sectional view illustrating the state of NG. 5.

Therefore, as illustrated in FIGS. 5 and 6, the outer circumference of the battery terminal connection part 20 may be in close contact with the inner circumference of the fixing member 50 in a state in which the fixing member 50 is completely screwed to the battery terminal connection part 20, and the inner circumference of the battery terminal connection part 20 may be maintained in a state of being in close contact with the outer circumference of the battery terminal 3.

At this time, the battery terminal connection part 20 may be in an elastically deformed state so that the outer diameter and inner diameter of the entire section thereof become a constant cylindrical shape in the vertical direction corresponding to the inner diameter of the fixing member 50 and the outer diameter of the battery terminal 3.

When the cable terminal 10 is to be separated from the battery terminal 3 for replacement of the battery 2 or maintenance of the vehicle, the fixing member 50 may be rotated in a loosening direction to be separated from the battery terminal connection part 20. In this state, as the battery terminal connection part 20 is returned to an original shape that the inner and outer diameters are expanded by a restoring force, the battery terminal connection part 20 may be easily separated from the circumference of the battery terminal 3.

As illustrated in FIGS. 7 to 11, the connection apparatus 1 may include a rotation limiting part 60 provided to limit the rotation of the fixing member 50 at a time point when the screwing of the fixing member 50 to the battery terminal connection part 20 is completed.

The rotation limiting part 60 prevents over-rotation of the fixing member 50 by limiting the rotation of the fixing member 50 in a state where the screwing of the fixing member 50 to the battery terminal connection part 20 is completed, so that the fixing member 50 and the battery terminal connection part 20 may be prevented from being damaged by the over-rotation of the fixing member 50.

Figure 7:
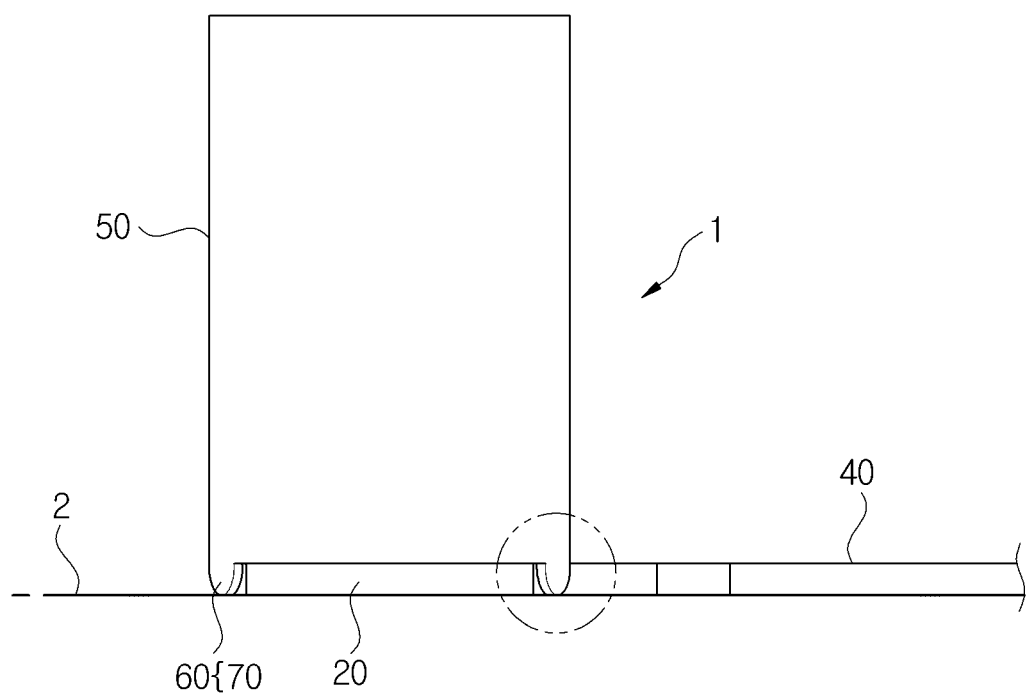
FIG. 7 is a side view illustrating a state in which a vehicle battery connection apparatus for a vehicle is connected to a battery terminal according to another embodiment of the disclosure.
Figure 8:
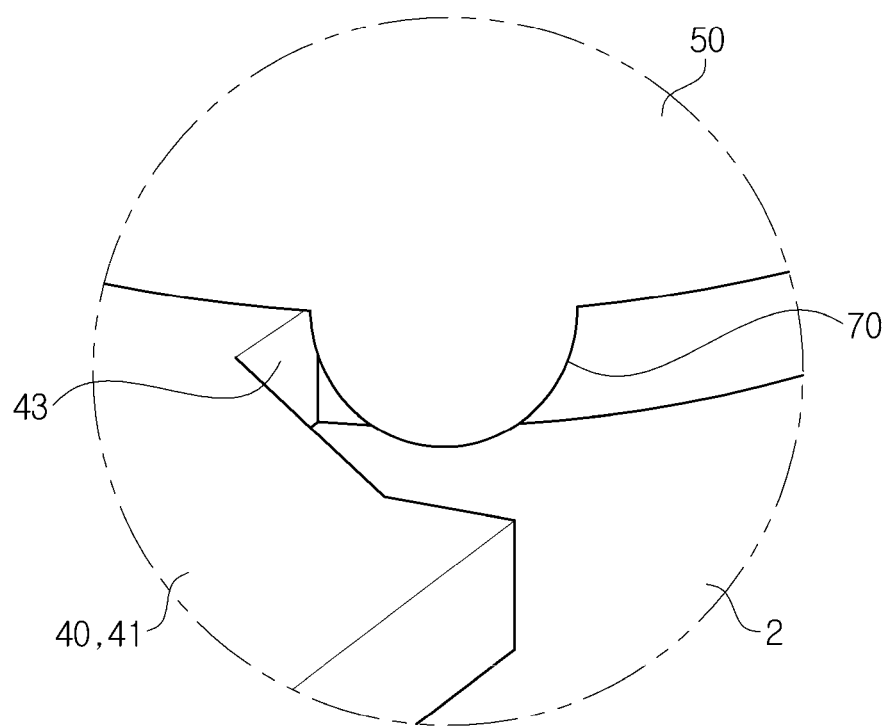
FIG. 8 is an enlarged perspective view of a main part of FIG. 7.

As illustrated in FIGS. 7 and 8, the rotation limiting part 60 may be provided as a support protrusion 70 protruding to be supported on an outer surface of the battery 2 around the battery terminal 3 at the lower end of the fixing member 50.

The support protrusion 70 may limit the over-rotation of the fixing member 50 as an end of the support protrusion 70 in a protruding direction is supported on the outer surface of the battery 3 around the battery terminal 3 at the time point when the screwing of the fixing member 50 to the battery terminal connection part 20 is completed.

The end of the support protrusion 70 in the protruding direction supported on the outer surface of the battery 2 is formed in a convex curved surface in the protruding direction, so that the outer surface of the battery 2 around the battery terminal 3 may be prevented from being damaged by the support protrusion 70.

Also, a plurality of the support protrusions 70 may be arranged to be spaced apart from each other along the circumference of the lower end of the fixing member 50 so that the fixing member 50 may be stably supported on the outer surface of the battery 2 around the battery terminal 3.

Figure 9:
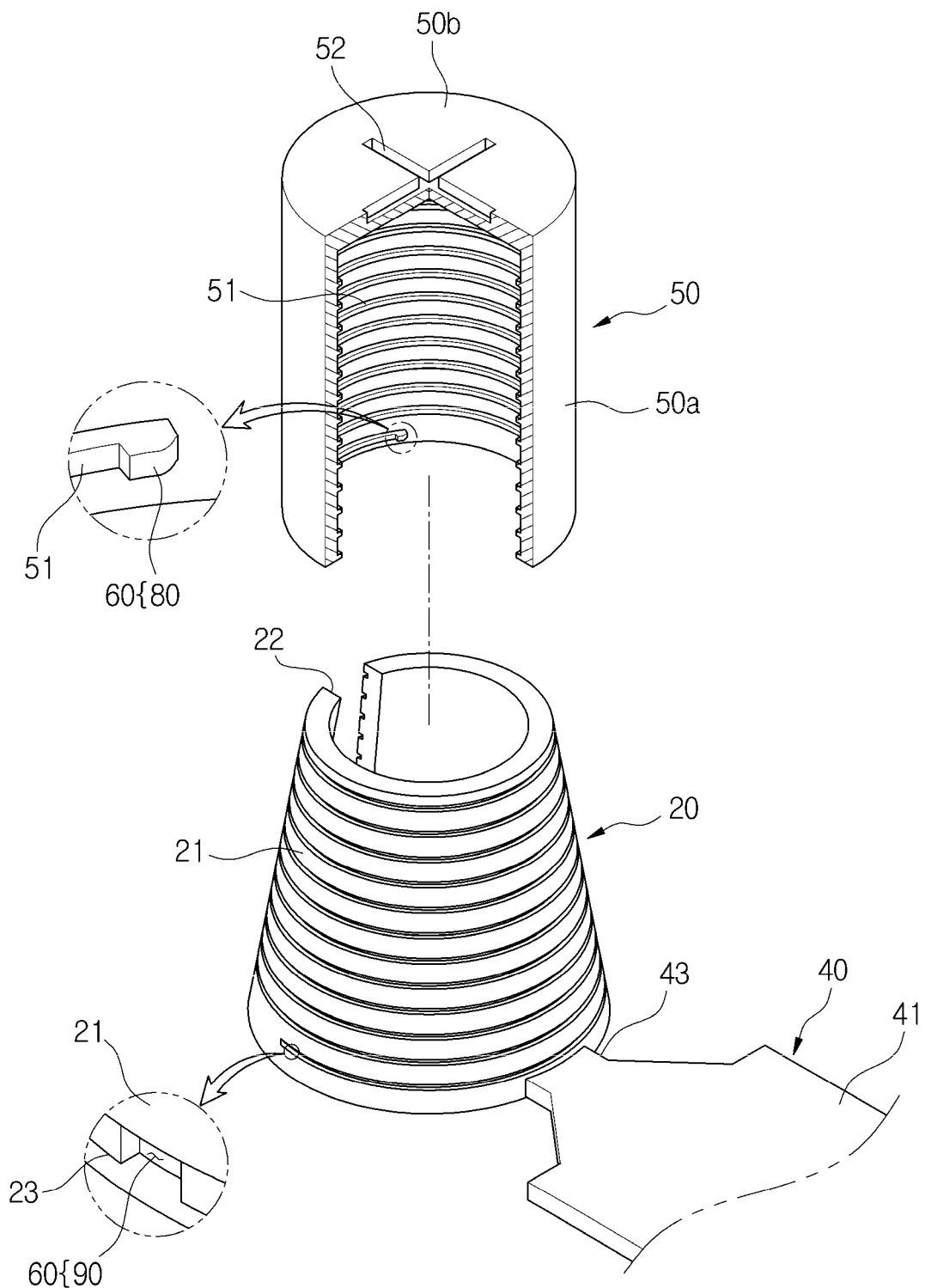
FIG. 9 is an exploded perspective view illustrating a structure of a battery terminal connection part and a fixing member of a battery connection apparatus for a vehicle according to another embodiment of the disclosure.
Figure 10:
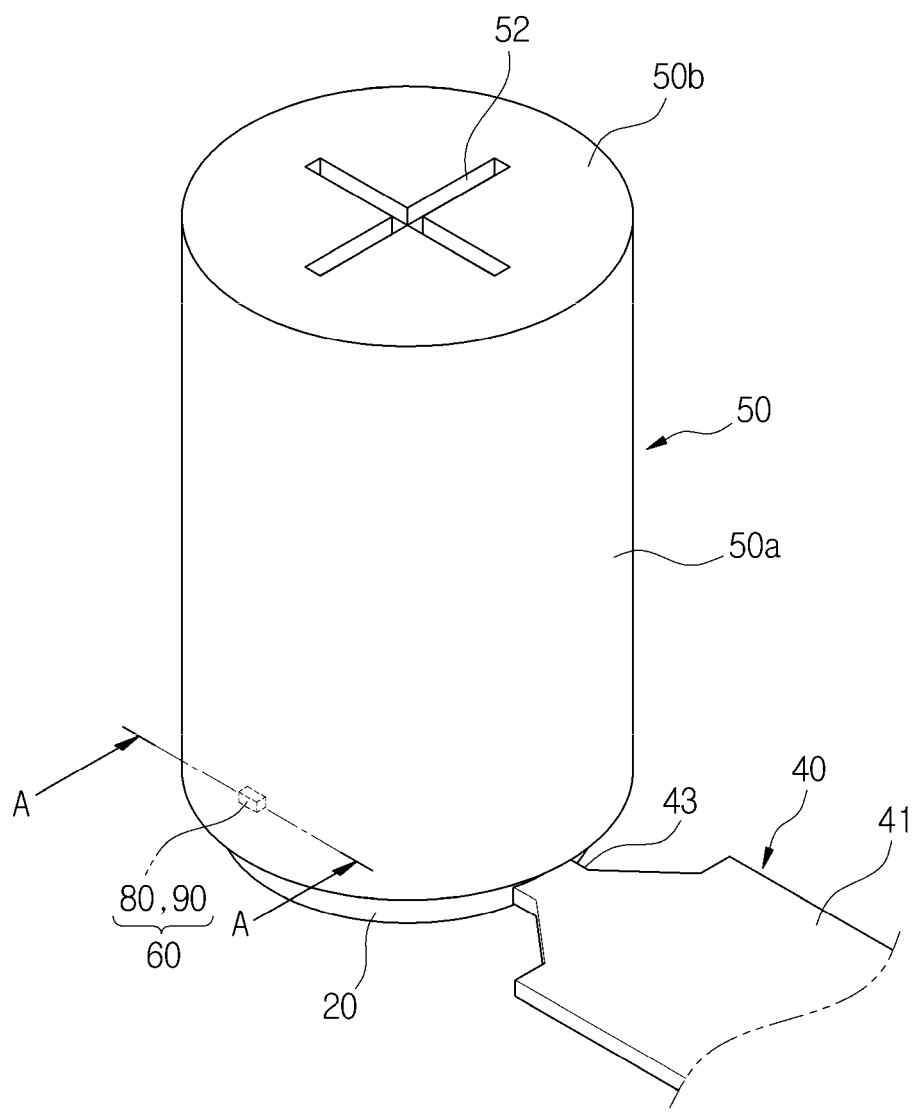
FIG. 10 is a view illustrating a state in which the fixing member of FIG. 9 is coupled to the battery terminal connection part.
Figure 11:
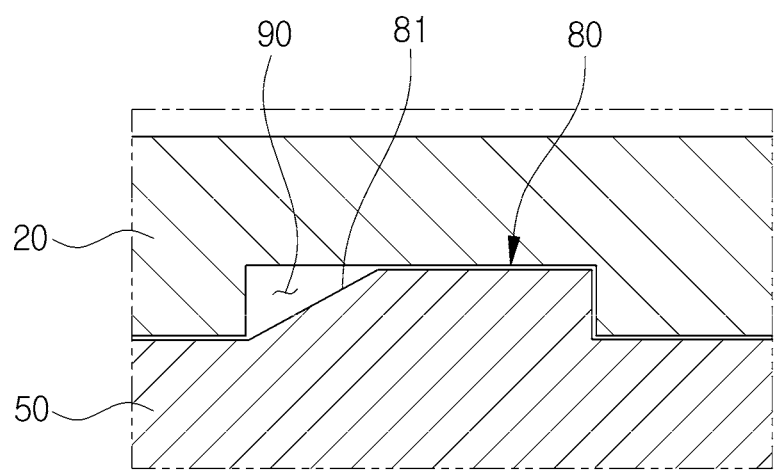
FIG. 11 is a cross-sectional view taken along line A-A of FIG. 10 and viewed in the direction of arrows.

As illustrated in FIGS. 9 to 11, the rotation limiting part 60 may be provided with a locking protrusion 80 provided on the inner circumference of the fixing member 50, and a locking groove 90 provided on the outer circumference of the battery terminal connection part 20 to allow the locking protrusion 80 to be inserted.

The locking protrusion 80 and the locking groove 90 may limit the over-rotation of the fixing member 50 in a method in which the locking protrusion 80 is inserted into and caught on the locking groove 90 at the time point when the screwing of the fixing member 50 to the battery terminal connection part 20 is completed.

To this end, the locking protrusion 80 may be provided on an end of the female thread 51 at the lower end of the fixing member 50, and the locking groove 90 may be provided on a screw groove 23 at a position corresponding to an end of the male thread 21 at the lower end of the battery terminal connection part 20.

An inclined surface 81 for guiding the locking protrusion 80 to the locking groove 90 may be provided at one end of the locking; protrusion 80 in the tightening direction of the fixing member 50, and the other end of the locking protrusion 80 in the loosening direction of the fixing member 50 may be angularly provided to suppress the locking protrusion 80 from being separated from the locking groove 90.

Therefore, the locking protrusion 80 may be easily inserted into the locking groove 90 by a guide action of the inclined surface 81 at the time point when the screwing of the fixing member 50 is completed, and may not be easily separated from the locking groove 90 by forming a stable locking structure with the locking groove 90 in a state of being inserted into the locking groove 90.

As is apparent from the above, according to an embodiment of the disclosure, a battery connection apparatus for a vehicle capable of improving work efficiency of connecting a terminal of a battery of the vehicle and a battery cable can be provided.

Further, according to an embodiment of the disclosure, the battery connection apparatus for a vehicle capable of simplifying a connection structure between the terminal of the battery of the vehicle and the battery cable can be provided.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A battery connection apparatus for a vehicle comprising:
   a cable terminal comprising a terminal connection part provided in a tubular shape to be fitted to a circumference of a battery terminal protruding from a battery of the vehicle, the terminal connection part having only one opening that gradually widens between an upper end and a lower end in a circumferential direction, and the terminal connection part having male threads formed on an outer circumference; and
   a fixing member configured to fix the battery terminal connection part in a state in which the battery terminal connection part is connected to the battery terminal, the fixing member having female threads that correspond to the male threads, formed on an inner circumference of the fixing member and configured to be screwed to an outer circumference of the battery terminal connection part;
   wherein the opening is formed from the upper end to the lower end of the terminal connection part.

2. The battery connection apparatus according to claim 1, wherein the battery terminal connection part is provided such that inner and outer diameters are expanded from the upper end toward the lower end along a screwing direction of the fixing member when an external force is removed.

3. The battery connection apparatus according to claim 2, wherein the fixing member has an inner diameter of a constant size in the screwing direction.

4. The battery connection apparatus according to claim 3, wherein the battery terminal connection part is provided such that the outer diameter of the upper end corresponds to the inner diameter of the fixing member.

5. The battery connection apparatus according to claim 3, wherein the battery terminal has a diameter of a constant size in a protruding direction, and
   the battery terminal connection part is provided such that the inner diameter of the lower end is larger than the diameter of the battery terminal.

6. The battery connection apparatus according to claim 5, wherein the battery terminal connection part is provided such that the inner diameter of the upper end corresponds to the diameter of the battery terminal.

7. The battery connection apparatus according to claim 2, wherein when the screwing of the fixing member to the battery terminal connection part is completed, the outer circumference of the battery terminal connection part is in contact with the inner circumference of the fixing member, and an inner circumference of the battery terminal connection part is in contact with an outer circumference of the battery terminal.

8. The battery connection apparatus according to claim 1, wherein the cable terminal further comprises a cable connection part configured to be connected to a battery cable for applying power of the battery to electric components of the vehicle, and a connector configured to connect the cable connection part and the battery terminal connection part,
   the connector comprises a body portion, and an extension portion extending from the body portion to be connected to a circumference of the battery terminal connection part, and
   a width of the extension portion is smaller than a width of the body portion.

9. The battery connection apparatus according to claim 1, wherein the cable terminal further comprises a cable connection part configured to be connected to a battery cable for applying power of the battery to electric components of the vehicle, and
   the cable connection part comprises:
   a first pressing portion having a ring shape and configured to press and fix a circumference of a core wire at an end of the battery cable from which a sheath is stripped;
   a second pressing portion having a ring shape and configured to press and fix a circumference of a portion covered by the sheath in the inside of the end of the battery cable; and
   a connection rib configured to connect one side of a circumference of the first pressing portion and the second pressing portion.

10. The battery connection apparatus according to claim 1, further comprising a rotation limiting part configured to limit the rotation of the fixing member when the fixing member is screwed to the battery terminal connection part.

11. The battery connection apparatus according to claim 10, wherein the rotation limiting part comprises a support protrusion protruding on an outer surface of the battery around the battery terminal at an end of the fixing member in a screwing direction.

12. The battery connection apparatus according to claim 11, wherein an end of the support protrusion in a protruding direction is formed in a convex curved surface in the protruding direction.

13. The battery connection apparatus according to claim 10, wherein the rotation limiting part comprises:
   a locking protrusion provided on the inner circumference of the fixing member; and
   a locking groove provided on the outer circumference of the battery terminal connection part so that the locking protrusion is inserted into the locking groove.

14. The battery connection apparatus according to claim 13, wherein the locking protrusion is provided on an end of the female thread in the screwing direction, and
   the locking groove is provided on a screw groove at a position corresponding to an end of the male thread in the screwing direction.

15. The battery connection apparatus according to claim 14, wherein an inclined surface for guiding the locking protrusion to the locking groove is provided at one end of the locking protrusion in a tightening direction of the fixing member, and an other end of the locking protrusion in a loosening direction of the fixing member is angularly provided to suppress the locking protrusion from being separated from the locking groove.

16. The battery connection apparatus according to claim 1, wherein the fixing member comprises:

a body portion of a tubular shape screwed to the battery terminal connection part;

a cover portion configured to cover an end of the body portion corresponding to a direction opposite to a screwing direction of the fixing member; and a polarity indicator indicating a polarity of the battery terminal is provided in a groove shape in a central portion of an outer surface of the cover portion.

* * * * *